United States Patent [19]
Herberger et al.

[11] Patent Number: 5,194,730
[45] Date of Patent: Mar. 16, 1993

[54] MOBILE ELECTRONIC LINEAL MEASUREMENT DEVICE WITH SWITCHABLE MAGNETIC MOUNT

[76] Inventors: Thomas J. Herberger, 7526 E. Tonawanda Creek Rd., Lockport, N.Y. 14094; Mark A. Herberger, 18 Albert Ct., Depew, N.Y. 14043

[21] Appl. No.: 887,160

[22] Filed: May 21, 1992

[51] Int. Cl.⁵ .............................................. G01D 5/34
[52] U.S. Cl. ............................................. 250/231.13
[58] Field of Search ........... 250/231.1, 231.13, 231.14, 250/231.17, 237 G, 239; 33/707

[56] References Cited

U.S. PATENT DOCUMENTS

| | | | |
|---|---|---|---|
| 2,280,437 | 4/1942 | Levesque | 175/367 |
| 3,987,338 | 10/1976 | Puetz | 250/231.1 |
| 4,132,890 | 1/1979 | Garcia et al. | 250/231.13 |
| 4,194,184 | 3/1980 | Hartmann et al. | 250/231.14 |
| 4,587,419 | 5/1986 | Kim | 250/231.14 |
| 4,752,683 | 6/1988 | McGuire | 250/231.14 |
| 4,806,752 | 2/1989 | Fischer | 250/231.14 |
| 5,038,243 | 8/1991 | Gordon | 250/231.13 |

Primary Examiner—David C. Nelms
Assistant Examiner—Michael Messinger
Attorney, Agent, or Firm—Howard J. Greenwald

[57] ABSTRACT

An apparatus for measuring the lineal movement of a product is disclosed. This apparatus contains a wheel, means for moving the wheel in the X axis or the Y axis, and means for producing at least one electrical signal every time said wheel is rotated. The wheel is in contact with the surface of a moving product, and means are provided to maintain such contact.

A signal is generated at least once every time the wheel is rotated. This signal is fed to a display device.

18 Claims, 6 Drawing Sheets

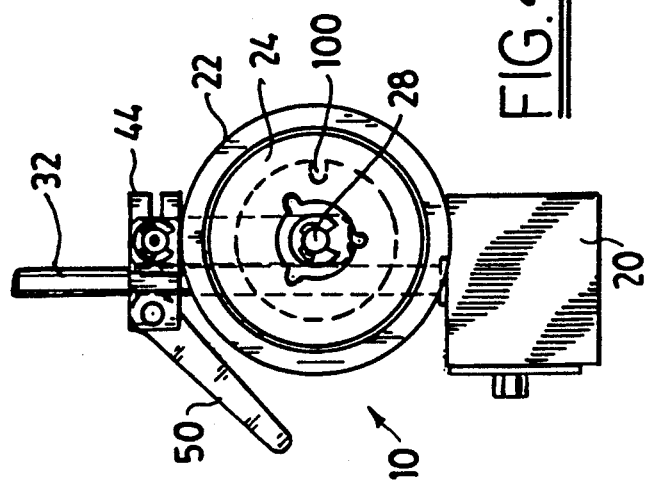
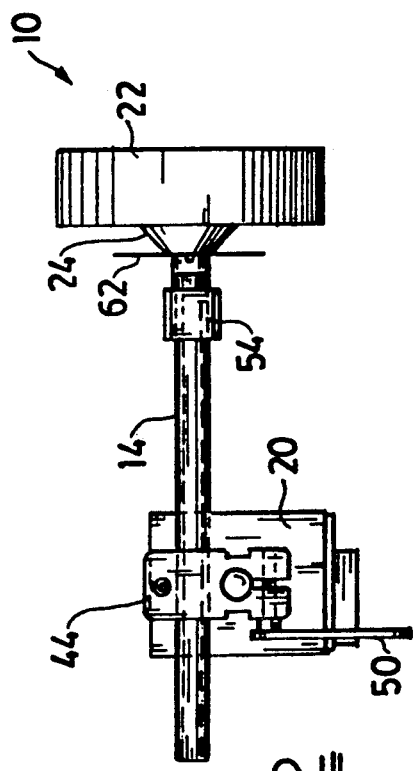
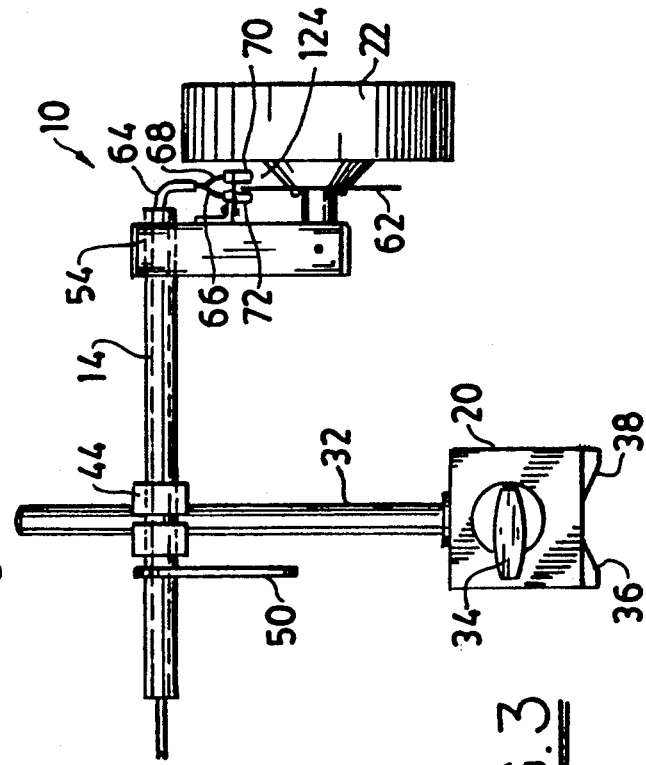

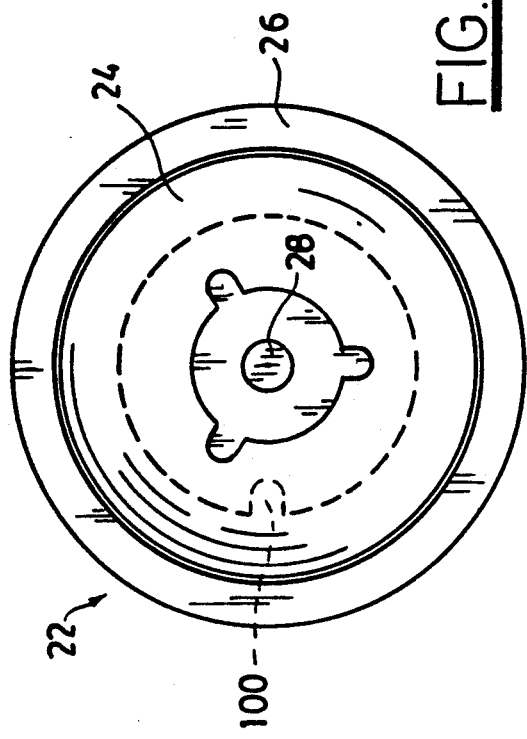
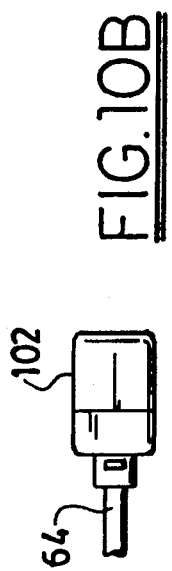
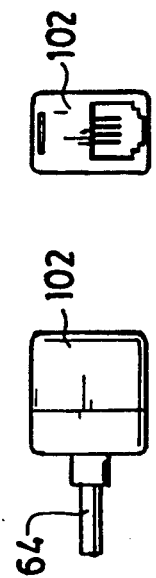
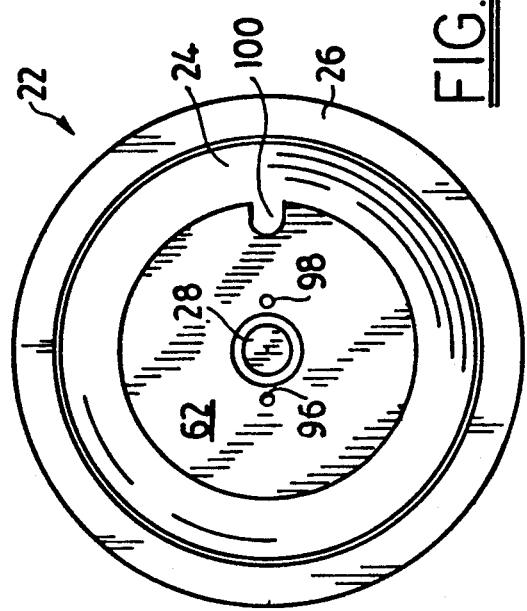
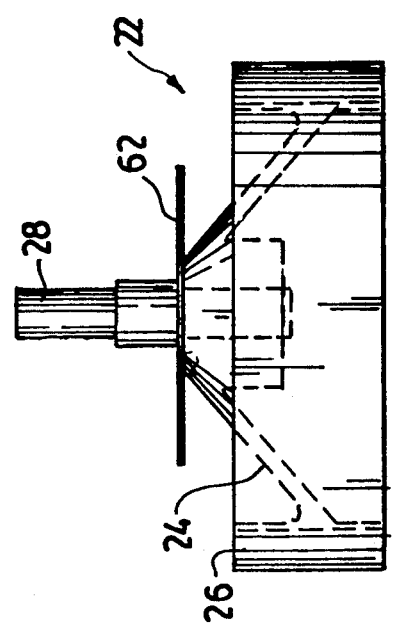

MOBILE ELECTRONIC LINEAL MEASUREMENT DEVICE WITH SWITCHABLE MAGNETIC MOUNT

FIELD OF THE INVENTION

A mobile, lineal measurement device to measure one or more moving objects.

BACKGROUND OF THE INVENTION

In many manufacturing processes there is a need to monitor the amount of goods being produced. Thus, for example, when architectural millwork is being manufactured, it is important to be able to determine the total output of any one machine.

Devices are available for monitoring the lineal output of a production machine. In general, these devices are relatively expensive and are adapted to be permanently affixed to the machine with which they are to be used. If one desires to change the location of the device, or to move it to another machine, expensive and time-consuming procedures generally must be employed.

United Kingdom patent GB2189316 discloses an electronic calculator which is connected to a distance measuring device. The apparatus of this patent may be manually held by an operator. However, this is not always practical during the long-term operation of a machine.

It is an object of this invention to provide an electronic device for accurately measuring the lineal output of machine.

It is another object of this invention to provide a measuring device comprised of a remote display which may be adjustably and removably mounted in a multiplicity of locations.

It is yet another object of this invention to provide a measuring device which can be adjustably and removably mounted in a multiplicity of locations.

It is yet another object of this invention to provide a measuring device comprised of a sensor which can be adjusted in the X and/or the Y and/or the Z plane.

SUMMARY OF THE INVENTION

In accordance with this invention, there is provided an apparatus for measuring the lineal output of a machine. This apparatus is comprised of a wheel operatively connected to a sensor, a remote display operatively connected to the sensor, means for adjusting the position of the wheel in the X and/or Y and/or Z axes, means for adjustably and removably mounting said display.

BRIEF DESCRIPTION OF THE DRAWINGS

The present invention will be more fully understood by reference to the following detailed description thereof, when read in conjunction with the attached drawings, wherein like reference numerals refer to like elements, and wherein:

FIG. 2 is a top view of the measuring machine of FIG. 1;

FIG. 3 is a side view of the measuring machine of FIG. 1;

FIG. 4 is an end view of the machine of FIG. 1;

FIGS. 8 and 9 are side views of the wheel used in the machine of FIG. 1;

FIG. 10 is a top view of the wheel and sensor of the machine of FIG. 1, illustrating how they are preferably operatively connected.

FIGS. 10a, 10b, and 10c are top, side, and end views of the jack;

DESCRIPTION OF THE PREFERRED EMBODIMENTS

Figure 1:
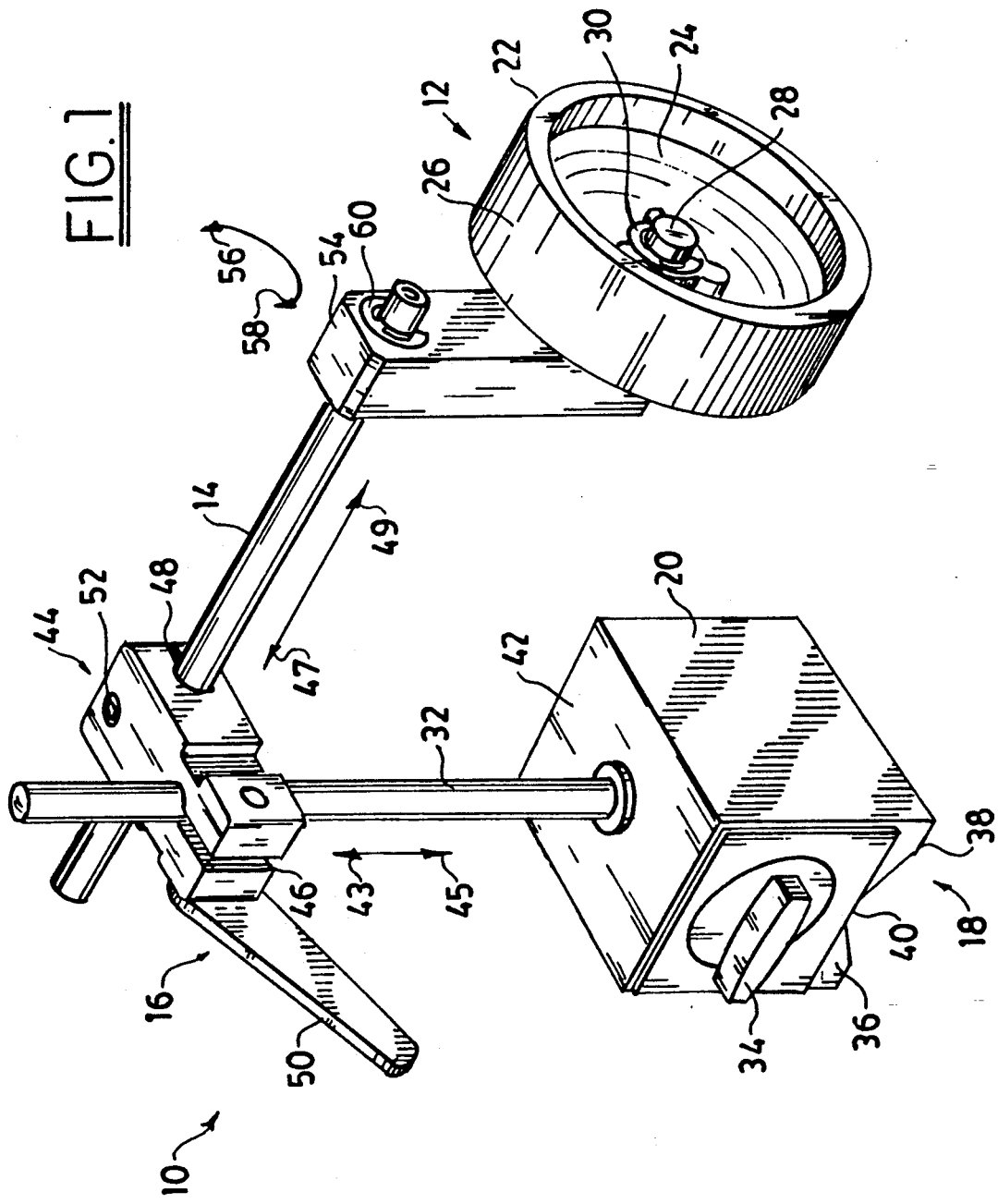
FIG. 1 is a perspective view of one preferred embodiment of the measuring machine of this invention.

One preferred embodiment 10 of applicants' measuring device is illustrated in FIG. 1. As will be described in more detail in this specification, machine 10 offers several unique advantages. It is more durable than prior art mechanical sensing devices and, thus, substantially more reliable. It affords the user substantially more flexibility in mounting, dismounting, and adjustment of the device.

Referring to FIG. 1, it will be seen that measuring machine 10 is preferably comprised of a sensor 12, a remote display (not shown in FIG. 1), a means 14 for adjusting the position of the sensor 12 in the X axis, a means 16 for adjusting the position of the sensor 12 in the Y axis, a means 18 for mounting machine 10 and for adjusting the position of the machine in any direction, and a releasable magnetic mount 20.

Referring again to FIG. 1, it will be seen that sensor 12 is comprised of wheel 22. Wheel 22 is adapted to contact the material being produced and measured. The motion of such material (not shown) causes wheel 22 to rotate, and the extent and speed of such rotation is measured by machine 10.

Wheel 22 preferably has a substantially cylindrical cross section. In the preferred embodiment illustrated in FIG. 1, the circumference of wheel 22 is such that one complete revolution defines a distance of one foot. As will be apparent to those skilled in the art, wheels 22 with other circumferences may be used and, when so used, the electronic circuitry and display associated with such wheels are adjusted to indicate the appropriate readout.

Referring again to FIG. 1, and in the preferred embodiment illustrated therein, it will be seen that wheel 22 preferably is comprised of a hub 24 and a tire 26. Hub 24 preferably consists essentially of a metal material, such as aluminum. Tire 26 preferably consists essentially of an elastomeric material, such as rubber.

The tire/hub wheel assembly 22 is rotatably mounted upon axle 28 and is secured to such axle by snap ring 30. Sensor 12 is adjusted so that tire 26 is in contact with the product being processed (not shown). The lineal movement of such product in contact with tire 26 causes the rotation of such tire and of wheel 22, which rotation is monitored and reported to the display.

In one preferred embodiment, the wheel 22 is obtained from part number MM-12 which is manufactured by the Rolatape Corporation of Spokane, Wash. The wheel 22 of this preferred embodiment is comprised of an oil-impregnated bronze bushing, an offset hub, and mounting holes.

Referring again to FIG. 1, it will be seen that measuring machine 10 is comprised of releasable magnetic mount 20. Releasable magnetic mount 20 provides a means for supporting vertical rod 32 which, in turn, supports the remainder of the measuring device 10. The releasable magnetic mount 20 also provides means for releasably mounting the device 10 in substantially any position on or in an iron-containing surface.

The releasable magnetic holding mount 20 is well known to those skilled in the art and is described, e.g., in U.S. Pat. No. 2,280,437 of Levesque, the disclosure of which is hereby incorporated by reference into this specification. As is well known to those skilled in the art, this mount 20 is comprised of a switching means 34. When switching means 34 is in the position depicted in FIG. 1, the magnet 20 is activated, and magnetic legs 36 and 38 will be attracted to and magnetically adhere to any iron-containing surface (such as, e.g., any steel surface or cast iron surface). When, however, switch 34 is moved to the deactivated position (not shown), legs 36 and 38 cease being magnetic and, in this situation, allow one to readily remove the mount 20 from the iron-containing surface. Thus, mount 20 allows one to readily magnetically attach and/or remove it from any iron-containing surface, depending upon the position of switch 34.

The type of magnetic mount 20 depicted in FIG. 1 is readily commercially available and may be obtained, e.g., from the Enco Manufacturing Company of Chicago, Illinois as part number 625-0300.

Referring again to FIG. 1, it will be appreciated that magnetic legs (such as legs 36 and 38) may appear on surfaces other than the bottom surface 40 of the mounting device 20. Thus, in one embodiment (not shown), similar mounting legs appear on the rear face (not shown) of mounting device 20.

Mounting device 20 is preferably comprised of a vertical rod 32, which is removably attached to the top surface 42 of device 20. Vertical rod 32 is preferably a solid piece of metal or metallic alloy which has sufficient strength and structural integrity to support the remainder of machine 10.

The remainder of machine 10 is adjustably connected to vertical rod 32, by means of means 16. Means 16 provides a method for both supporting the remainder of machine 10 and for allowing one to adjust the height of machine 10 in the Y and X axes.

Means 16 is comprised of a clamping block 44. Clamping block 44 is preferably an integral assembly which is comprised of a slotted vertical orifice 46 through which rod 32 may fit, a slotted horizontal orifice 48 through which tube 14 may fit, means 50 for constricting slotted vertical orifice 46, and means 52 for constricting slotted vertical orifice 48.

As will be appreciated by those skilled in the art, cinch lever 50 may be positioned so that vertical rod 32 is disposed within the annular portion of slotted vertical orifice 46; the clamping block 44 may be moved in the directions of arrows 43 and 45 until the desired position is obtained. When the clamping block is so positioned that the wheel 22 is at the desired height, cinch lever 50 may be closed in order to constrict the slotted vertical orifice 46 and to lock the wheel 22 into place at its desired height.

In a similar manner, wheel 22 may be moved in the X axis, in the directions of arrows and 49, when slotted horizontal orifice 48 is sufficiently unrestricted so that tube 14 may be freely moved within slotted horizontal orifice 48 until the desired horizontal position of wheel 22 is obtained. Thereafter, one may constrict slotted horizontal orifice 48, and thereby lock tube 14 into place, by tightening screw 52.

Tube 14 is preferably a substantially hollow structure through whose center (not shown) cables or wires may be passed. As will be apparent to those skilled in the art, such cables or wires (not shown in Figure) can transmit information from wheel 22 and its associated sensing apparatus (not shown in FIG. 1) to the display (not shown in FIG. 1). In the preferred embodiment illustrated, the passage of said cables and wires through a hollow tube 14 also serves to protect such cables and wires.

Referring again to FIG. 1, it will be seen that knee 54 is rotatably mounted on tube 14; wheel 22, in turn, is rotatably connected to knee 54 by means of axle 28. Thus, when machine 10 is measuring a product (not shown) with a variable thickness, if the wheel 22 were at a rigid, fixed height it might miss contacting some of the less thick portions of the product. However, because knee 54 is free to rotate in the direction of arrows 56 and 58, applicants' measuring assembly is self adjusting on the Y axis. When the wheel 22 contacts a portion of a product at its desired height, then knee 54 is so disposed that it is rotated at least somewhat in the direction of either arrow 56 or arrow 58. When, however, a portion of the product appears which is thinner than desired, the knee 54 will tend to move away from the direction of either arrow 56 or 58 and will thereby maintain the wheel 22 in contact with the product.

Referring again to FIG. 1, it will be seen that a snap ring 60 may be used to lock knee 54 into position onto tube 14. A similar snap ring (not shown in FIG. 1) is disposed on the other side of knee 54.

FIG. 2 is a top view of the measuring machine of FIG. 1. Referring to FIG. 2, it will be seen that hub 24 (which is connected to wheel 22) is also connected to slotted disk 62. As wheel 22 rotates, slotted disk 62 is caused to rotate in the same manner and to the same extent.

FIG. 3 is a side view of machine 10. Referring to FIG. 3, it will be seen that cable 64 is disposed within tube 14 and encloses four wires (such as, but not limited to, wires 66 and 68). The wires enclosed by cable 64 serve several purposes. One set of such wires provides direct current power to an infrared light-emitting diode 70, and another set of such wires provides means for transmitting a signal from infrared detector through tube 14 to the display (not shown).

Figure 5:
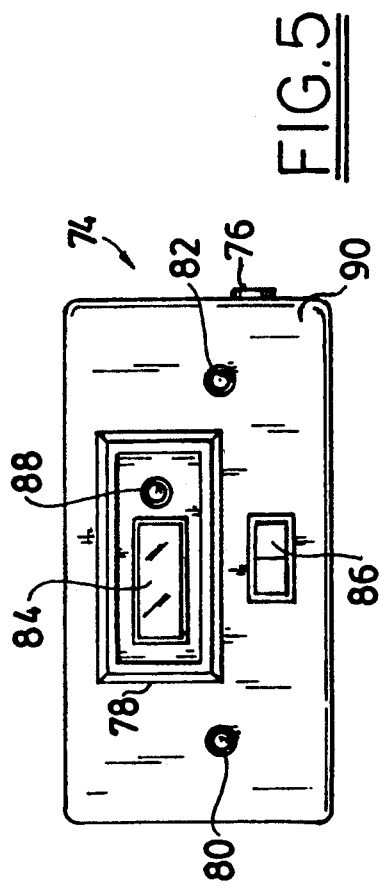
FIG. 5 is a top view of the display used in the machine of FIG. 1.

FIG. 5 is a top view of a display 74 which may be used in the apparatus 10 of this invention. A cable (not shown) is connected to connector 76, which electrically communicates with a power supply (not shown in FIG. 5) disposed within display 74. In the preferred embodiment illustrated in FIG. 5, the power supply provides 12 volt direct current to counting module 78, to light emitting diodes 80 and 82, to infrared emitter 70, and to infrared detector 72. It will be apparent to those skilled in the art that, depending upon the circuitry utilized, other levels and/or types of power may be required and supplied.

Display 74 is comprised of counting module 78 which, in turn, is comprised of display window 84, on-off switch 86, and reset button 88.

Figure 7:
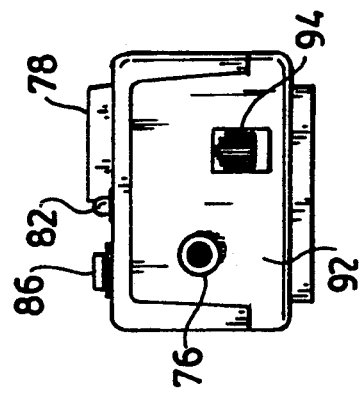
FIG. 7 is an end view of the display of FIG. 5.
Figure 6:
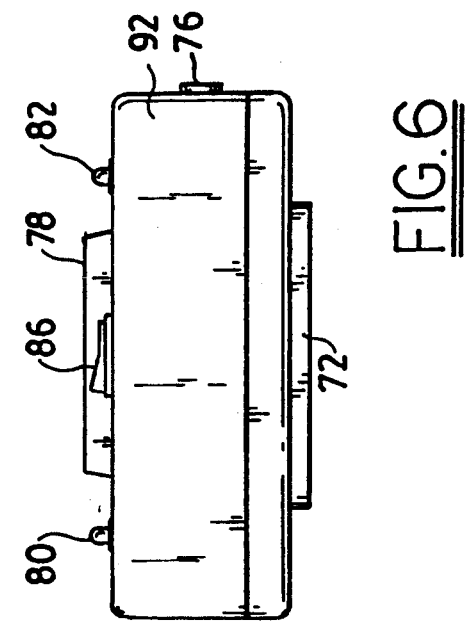
FIG. 6 is a side view of the display of FIG. 5.

The display also is comprised of a housing 90 which, preferably, is a plastic enclosure with a magnetic mounting means 92 (see FIGS. 6 and 7). The housing, minus the mounting means 92, is readily available and may be purchased (as part number MB-20) from All Electronics of Van Nuys, Calif. The magnetic mounting means may be attached by adhesively joining rectangular strips of magnetic material to the bottom of housing 90.

The counting module 78 is comprised of a conventional integrated counting circuit with a display and contains means to count input pulses, and means to digitally display data. These modules are well known to those skilled in the art and are available, e.g., from Red Lion Controls of York, Pa. (as part CUB2L).

The light emitting diodes are preferably colored and have the T 1¾ size. These diodes are commonly available and may be obtained from All Electronics Company, supra.

The display 74 can be removably and magnetically attached to a multiplicity of different positions; and, when connected with the remainder of measuring device 10, can provide the rate of travel of the product being measured, the total amount of travel of the product being measured, the elapsed time of travel, and other similar information.

FIG. 6 is a side view of display 74. FIG. 7 is an end view of display 74. Referring to FIG. 7, it will be seen that display 74 is comprised of a jack 76, and a second jack 94.

Jack 76 is adapted to receive a cable (not shown) which will transmit power from an external source (not shown) and provide it to the display 74. Jack 94 is preferably a standard telephone jack which will transmit power from the display 74 to the emitter 70 and the detector 72.

FIG. 8 is side view of the wheel 22/hub 24/slotted disk 62 assembly. Referring to FIG. 8, it will be seen that, in this embodiment, slotted disk 62 is connected to hub 28 by means of cap head screws 96 and 98. Slotted disck 62 also is comprised of slot 100.

Referring again to FIG. 3, it will be seen that slotted disk 62 is disposed between emitter 70 and detector 72 and is caused to rotate by its connection to hub 24. The infrared beam which is emitted by emitter 70 may only pass to detector 72 once each revolution of slotted disk 62, when the slot 100 is aligned with the output of emitter 70. Thus, once per revolution, the infrared beam is allowed to pass to the detector 72 and, subsequently, is counted by the counting module 78.

Referring to FIG. 10, it will be seen that the wheel/slotted disk assembly is electrically connected to both a jack 102. FIG. 10A is a top view of such jack, FIG. 10B is a side view of such jack, and FIG. 10C is an end view of such jack. The jack 102 may be used to connect and disconnect a cable fitted with a male plug (not shown) so that the machine 10 can be readily connected or disconnected from the display 74.

Figure 11:
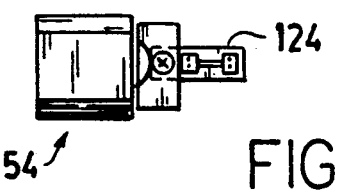
FIG. 11 is a top view of the sensing switch utilized in the machine of FIG. 1.
Figure 12:
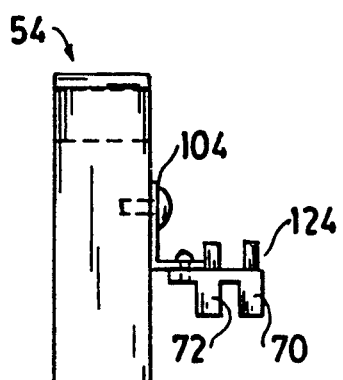
FIG. 12 is a side view of the switch of FIG. 11.
Figure 13:
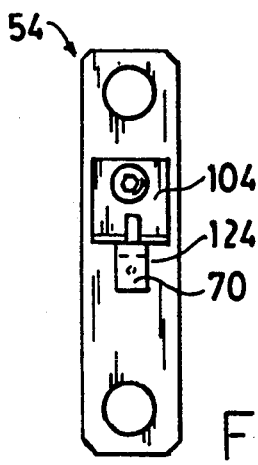
FIG. 13 is an end view of the switch of FIG. 11.

FIGS. 11, 12, and 13 are top, side, are end views, respectively, of knee 54. Referring to FIG. 12, and in the preferred embodiment illustrated therein, it will be seen that a bracket 104 is used to connect the emitter 70/detector 72 assembly to the knee 54.

Figure 14:
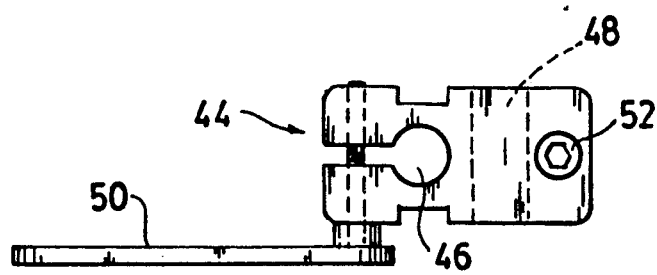
FIG. 14 is a top view of the adjusting means used in the machine of FIG. 1.
Figure 15:
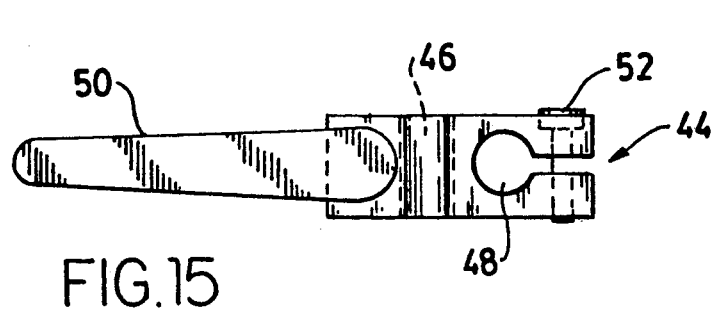
FIG. 15 is a side view of the adjusting means of FIG. 14.
Figure 16:
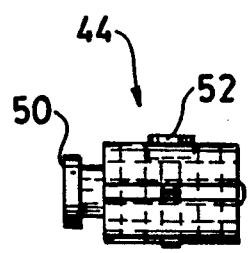
FIG. 16 is an end view of the adjusting means of FIG. 14.

FIGS. 14, 15, and 16 illustrate the clamping block 44 assembly.

Figure 17:
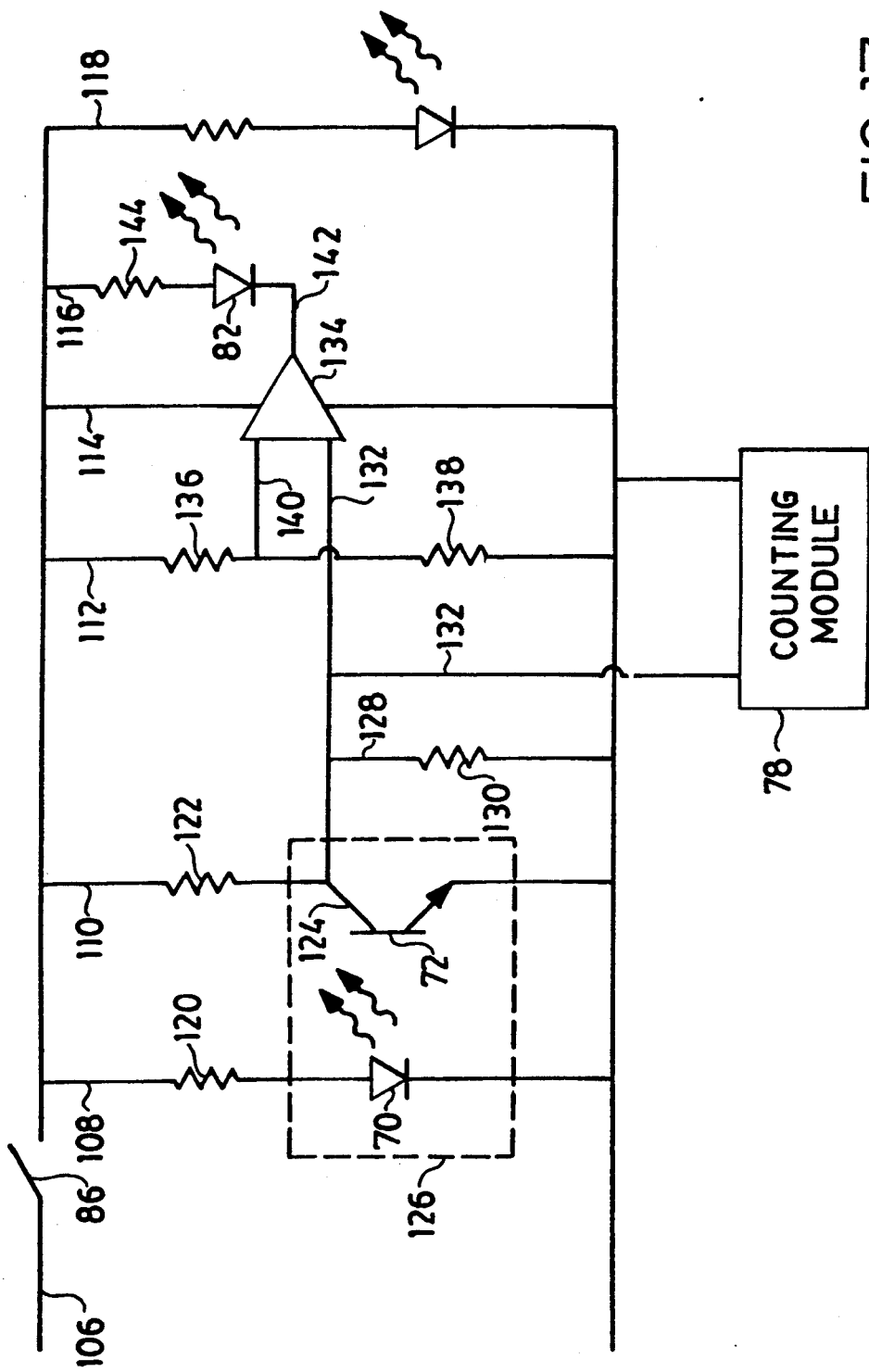
FIG. 17 is an electrical schematic of a preferred circuit for the display used in the machine of FIG. 1.

FIG. 17 is a schematic of one preferred circuit for use in display 74. Referring to FIG. 17, it will be seen that power from a power supply (not shown) passes via line 106 to switch 86 which, when closed, allows it to pass further to parallel branches 108, 110, 112, 114, 116, and 118. In parallel branch 108, resistor is a 1,000 ohm 0.25 watt resistor; in this circuit, all of the resistors have an 0.25 watt power rating. Current passing through resistor 120 is fed to infrared emitter 70 (part number OPB829C, Optek Corporation, Carrollton, Tex.). In branch 110, resistor is a 10,000 ohm resistor, and current passing through it is fed to the collector 124 of detector 72 (also part number OPB829C). The combination of the emitter 70 and the detector 72 comprise optical switch.

Referring again to FIG. 17, current passing through resistor 122 also is fed to branch (which is comprised of 3,300 ohm resistor 130), to line 132 (which is electrically connected to counting module 78), to the input line 132 of comparator(discussed later).

The input direct current fed via line 106 also flows in branch 112 (which is comprised of 5,100 ohm resistor 136 and 220 ohm resistor). Current also flows from resistor 136 to input line 140 of comparator 134. The comparator can compare inputs 132 and 140 and, when the voltage in line 132 is lower than the voltage in line 140, will turn on light emitting diode 82, feeding it a suitable signal via output line 142. Comparator 134 preferably is obtained from the All Electronics Company as part number LM311.

Power from line 106 also is fed to branch 116 (which is comprised of 560 ohm resistor 144) and to line 118 (which is comprised of 470 ohm resistor 146).

It is to be understood that the aforementioned description is illustrative only and that changes can be made in the apparatus, in the ingredients and their proportions, and in the sequence of combinations and process steps, as well as in other aspects of the invention discussed herein, without departing from the scope of the invention as defined in the following claims.

Thus, in on embodiment, slotted disk 62 can be comprised of a multiplicity of slots 100 and, in this embodiment, may consist essentially of plastic material.

Thus, one may use other means for determining the speed and extent of the rotation of wheel 22. One may thus use a reflective infrared emitter/detector assembly, a mechanical switch, gated optical switch, a magnetic pick-up, a proximity sensor, and the like.

Thus, instead of being comprised of metal, clamping block 44 may be made out of plastic material or may be cast or may comprise a releasable ratchet lever.

Thus, instead of preferably consisting essentially of aluminum, knee 54 can be made out of steel or plastic. Furthermore, instead of using such knee 54, one may directly mount wheel 22 onto a horizontal tube or spring load knee 54 to maintain wheel 22 in contact with the product to be measured.

Thus, support tube 14 can be replaced with a solid rod, and the connecting wires can be passed outside of said rod or tube.

Thus, instead of using modular connectors 102 and/or 94, other multi-conductor connectors may be used (such as DIN connectors, stereo jacks, and the like).

Thus, although it is preferred to use a circuit board such as part number 276-150 (Radio Shack, Fort Worth, Tex.), any of several other predrilled circuit boards of similar size may be used.

Thus, instead of, or in addition to, the counting module 78, one may also use a timer/rate module with an LED display. It will be apparent to those skilled in the art that, with the use of conventional integrated circuits, one may provide display 74 with means to simultaneously or sequentially monitor and display the speed of the movement of the product, the rate of the movement of the product, the total amount of product, the amount of time elapsed from a specified reference point or from the beginning of the process, and the like.

Thus, in one embodiment, the output from the sensor assembly is fed to two or more display units 74.

Thus, in one embodiment, the mount 20 is non releasable and/or is permanently attached to a surface.

Thus, in one embodiment, reset button 88 may only be activated if a keyed lock switch is turned on. This embodiment prevents unauthorized users from resetting the display.

We claim:

1. An apparatus for measuring the lineal movement of a product, wherein said apparatus is comprised of a wheel, means for moving said wheel in the X axis, means for moving said wheel in the Y axis, means for producing at least one electrical signal every time said wheel is rotated, a display unit, means for transmitting said electrical signal to said display unit, and mounting means for supporting said wheel, wherein:
    (a) said mounting means is comprised of a support surface, switching means for making said support surface magnetic, and switching means for making said support surface nonmagnetic; and
    (b) said apparatus is comprised of means for contacting said wheel with the surface of said product and maintaining said wheel in contact with said surface.

2. The apparatus as recited in claim 1, wherein said display unit is a remote display unit.

3. The apparatus as recited in claim 2, wherein said remote display unit is comprised of means for removably attaching said display unit to a surface.

4. The apparatus as recited in claim 3, wherein said wheel has a circumference of about 1 foot.

5. The apparatus as recited in claim 3, wherein said wheel is comprised of an inner hub and, contiguous therewith, an outer tire.

6. The apparatus as recited in claim 5, wherein said outer tire consists essentially of elastomeric material.

7. The apparatus as recited in claim 3, wherein said apparatus is comprised of a clamping block.

8. The apparatus as recited in claim 7, wherein said clamping block is comprised of a first slotted orifice.

9. The apparatus as recited in claim 7, wherein said clamping block is comprised of a second slotted orifice.

10. The apparatus as recited in claim 3, wherein the force of gravity tends to maintain said wheel in contact with the surface of said product.

11. The apparatus as recited in claim 3, wherein said means for producing at least one signal is comprised of a means for emitting electromagnetic radiation.

12. The apparatus as recited in claim 11, wherein said means for producing at least one signal is comprised of means for receiving said electromagnetic radiation.

13. The apparatus as recited in claim 12, wherein said means for producing at least one signal is comprised of a slotted disk and means to cause said slotted disk to rotate in synchrony with said wheel.

14. The apparatus as recited in claim 13, wherein said electromagnetic radiation is infrared radiation.

15. The apparatus as recited in claim 3, wherein said remote display unit is comprised of means for magnetically attaching said display unit to a surface.

16. The apparatus as recited in claim 3, wherein said wheel is comprised of an oil-impregnated bushing.

17. The apparatus as recited in claim 3, wherein said remote display unit is comprised of a counting module.

18. The apparatus as recited in claim 17, wherein said counting module is comprised of an integrated counting circuit.

* * * * *